United States Patent [19]
Sakamoto

[11] 3,895,964
[45] July 22, 1975

[54] STORAGE BATTERY FOR VEHICLES
[75] Inventor: Akira Sakamoto, Kureme, Japan
[73] Assignee: Daiden Co., Inc., Fukuoka, Japan
[22] Filed: July 18, 1973
[21] Appl. No.: 380,337

[30] Foreign Application Priority Data
Aug. 2, 1972  Japan.............................. 47-91022

[52] U.S. Cl. ............................................. 136/182
[51] Int. Cl. ......................................... H01m 31/04
[58] Field of Search ..................................... 136/182

[56] References Cited
UNITED STATES PATENTS
2,631,183  3/1953  Babis ................................ 136/182
3,093,516  6/1963  Hennen et al. ..................... 136/182

Primary Examiner—John H. Mack
Assistant Examiner—H. A. Feeley
Attorney, Agent, or Firm—Brisebois & Kruger

[57] ABSTRACT

In a storage battery for vehicles, each of the battery caps comprises a cylindrical body having its lower end immersed in electrolyte and which contains a colored spherical float having a specific gravity of about 1.2 which indicates the level or specific gravity of the electrolyte due to reflection of the color of the float from the bottom of the float chamber.

8 Claims, 4 Drawing Figures

PATENTED JUL 22 1975                    3,895,964

1

STORAGE BATTERY FOR VEHICLES

SUMMARY OF THE INVENTION

The present invention relates to a storage battery for vehicles, especially a storage battery having cap devices for indicating the specific gravity and level of the electrolyte therein.

In principle, it is necessary that the electrolyte in a storage battery should be kept at a fixed level above two plates at the poles because the two plates react chemically only when entirely covered by electrolyte. If part of the plates is exposed to the air, not only the exposed part but the part remaining in the electrolyte becomes unfit for use. However, the volume of electrolyte is reduced with use, which is mainly due to evaporation of the water therein, although there are some other reasons for the phenomenon, for example, the escape of gas at the end of charging, and so on. Prior to any excessive reduction in the volume of electrolyte, distilled water should be added to the electrolyte to bring it up to said fixed level.

Furthermore, even if the desired level of electrolyte in the storage battery has been maintained, frequent attention needs to be paid to the specific gravity of the electrolyte so as to determine the proportion between charge and discharge, avoid excess discharge, and avoid a decline in the capacity of the storage battery. When the temperature of the electrolyte falls below 15°C, its specific gravity, which is 1.28–1.26 when fully charged, falls to 1.210, which amounts to a half charge or even to 1.160 which amounts to a quarter charge.

For both said conditions, it is difficult to measure and examine the condition of the electrolyte in conventional storage batteries for vehicles by removing the battery cap each time and peeping into the inside of the cells. This method does not permit measurement to be carried out exactly, especially when the storage battery is in the dark, or is of a small size.

The primary object of this invention is to provide a cap for a storage battery consisting of a cylindrical body having a small float therein, through which the level or specific gravity of the electrolyte in the storage battery can be measured visually with scientific exactness so as to keep a fixed quantity of electrolyte in the battery all the time.

Another object of this invention is to provide a cap device for a storage battery which permits the electrolyte therein to be examined even when the storage battery is of small size and positioned in dim light.

A further object of the present invention is to provide a cap for a storage battery which is simple in construction and low in cost because it can be mounted in a conventional storage battery, without complicating the structure.

In accordance with the present invention, efficient and perfect measurement of the electrolyte in a storage battery can be carried out so as to avoid the above-mentioned defects resulting from conventional devices.

Other objects and advantages of this invention will be better understood from a consideration of the following detailed description of my invention, with reference to the accompanying drawings, in which.

Figure 1:
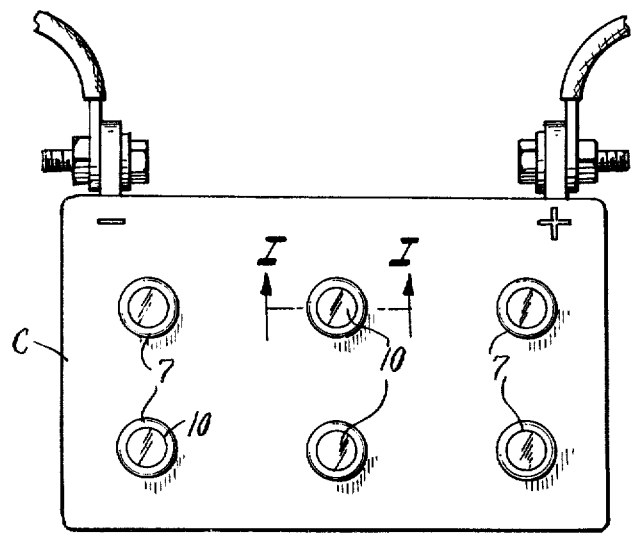
FIG. 1 is a top plan view of a storage battery according to the present invention.
Figure 2:
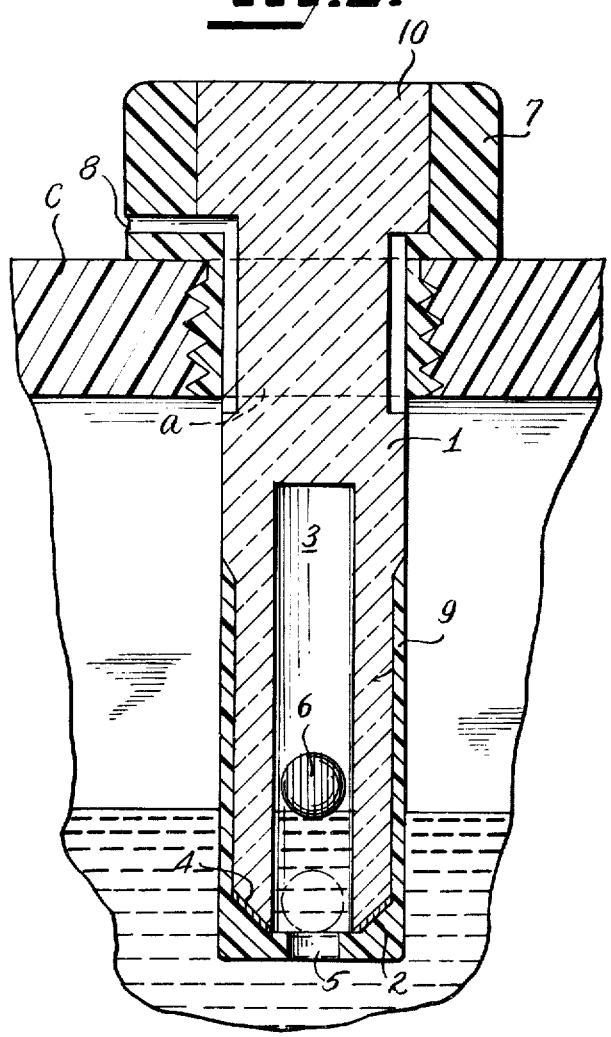
FIG. 2 is a partial vertical sectional view taken along the line I—I of FIG. 1.

Referring now to FIGS. 1 and 2, the storage battery casing C in the present invention is provided with a plurality of caps, each of which consists of transparent and corrosion resistant cylindrical body immersed in electrolyte at its lower end. The cylindrical body 1 has an inlet hole 5 in its bottom through which electrolyte flows into the inner longitudinal chamber 3. The body 1 has a conical bottom end 2 making an angle of 45° and tapering toward said opening 5. The inclined part 2 is plated with a highly polished reflective metal 4, such as speculum metal. The lower half of the cylindrical body 1 is covered with plastic material except for the central inlet hole 5 for electrolyte. This body passes through opening a in the top of the storage battery box c, in which it is retained by screw means. In the inner chamber 3, is a spherical float 6 which has a diameter larger than that of inlet hole 5. The float 6 is made of colored transparent material having a specific gravity of about 1.2 and floating on the electrolyte free to move with respect to the wall of the inner chamber 3 when in its normal state. The top of the cylindrical body 1 constitutes a peephole 10 protected by the opaque screw head 7. A passage 8 through which gas in the storage battery C is exhausted is provided between the screw head 7 and the cylindrical body 1.

Figure 3:
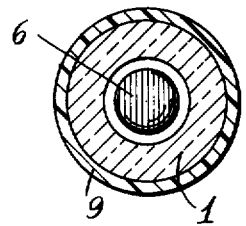
FIG. 3 is a view taken through a cylindrical member in the storage battery showing a sufficiency of charge or of level of electrolyte.
Figure 4:
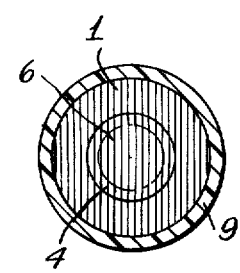
FIG. 4 is a view taken through the same body in the storage battery showing an insufficiency of charge or a decrease in the level of electrolyte below the bottom of the cylindrical body.

In this invention, when the specific gravity of the electrolyte falls below 1.2 when the battery discharges over a long period of time, the spherical float 6 with specific gravity of about 1.2 drops down to rest on a concave part at the bottom of the cylindrical body, i.e., the speculum metal 4. Under these circumstances, when observed through the transparent window 10, the entire bottom end 2 appears to have the same color as the spherical float 6 because of the reflection of the color of the float against the speculum metal 4 as shown in FIG. 4. If the bottom end 2 in the cylindrical body appears to be entirely colored, the battery should be recharged until the float resting on the inlet opening 5 rises to float on the electrolyte again. When the float 6 is floating on the electrolyte because the battery is adequately charged, a different view shown in FIG. 3 will be seen. In this view a ring-shaped part having a different color from the float appears as a concentric circle. Moreover, when the electrolyte decreases in quantity below the level of the bottom of the cylindrical body, chiefly because of evaporation of water therein, this is indicated by the same way, i.e., a change in color at the bottom end of the cap because the float is sitting on the concave part. Therefore, when the appearance shown in FIG. 4 is observed through the peephole, two possible reasons should be considered, that is, insufficiency of charge or decrease in volume of electrolyte below the bottom level of the cylindrical body.

Thus, according to the present invention, the measurement of the electrolyte is carried out in a short time by simply looking through the peephole and examining the color of the bottom end of the cylindrical body without removing the cap of the storage battery. Accordingly, the desired condition of electrolyte can be determined in dim light or in a storage battery of small size. Additionally, it is entirely practical to place the measuring device within the storage battery because the device has no effect on the storage battery.

What is claimed is:

1. In a storage battery having at least one cell containing a liquid electrolyte which should be maintained at at least a predetermined minimum level and a cap for said cell, the improvement according to which the lower part of said cap extends downwardly to said minimum level and defines a central chamber open at its bottom to admit said electrolyte, the portion of said cap directly above said chamber being transparent and said chamber having a light reflective bottom wall portion inclined downwardly toward and encircling said opening, and a transparent colored float in said chamber which is larger in diameter than said opening but smaller than the outer diameter of said inclined wall portion and has a specific gravity less than the specific gravity of said electrolyte when said cell is fully charged, whereby when said colored float is resting on said bottom wall portion, only the color of said float may be seen through said transparent material due to reflection of said color by said bottom wall portion, whereas a ring of a different color may be seen encircling said float when said float is above said bottom wall portion.

2. A cap for a storage battery having at least one cell containing a liquid electrolyte which should be maintained above a predetermined level, said cap comprising a body portion dimensioned to project downwardly into said electrolyte when said cap is mounted on said cell and said electrolyte is above said predetermined level, said body portion defining a chamber therewithin having a bottom, an opening in said bottom for admitting electrolyte to said chamber and an inwardly and downwardly inclined light reflective upper surface on said bottom around said opening, the portion of said cap above said chamber being transparent, and a transparent float in said chamber which is larger in maximum diameter than said opening, but smaller in diameter than said collective surface, whereby only the color of said float may be seen through said transparent portion when said float is resting on said bottom, due to reflection of said color by said reflective surface, but a ring of a different color may be seen encircling said float when said float is riding above said bottom.

3. A cap as claimed in claim 2 in which said specific gravity of said float is equal to the specific gravity of said electrolyte when said cell has a predetermined charge.

4. A cap as claimed in claim 2 in which the specific gravity of said float is about 1.2.

5. A cap as claimed in claim 2 in which said float is a hollow sphere.

6. A cap as claimed in claim 2 in which said float is made of a material resistant to corrosion by said electrolyte.

7. A cap as claimed in claim 2 in which said transparent portion is encircled by an opaque portion by means of which said cap may be mounted on said battery.

8. A cap as claimed in claim 2 defining a vent leading from the interior of said battery to its exterior when said cap is mounted on said battery.

* * * * *